United States Patent
Böhm et al.

(10) Patent No.: US 6,606,121 B1
(45) Date of Patent: Aug. 12, 2003

(54) LOCAL AUTO-ADAPTIVE OPTIC SENSOR

(76) Inventors: Markus Böhm, Hölderlinstr. 3, D-57068 Siegen (DE); Tarek Lule, Am Eichenhang 21, D-57076 Siegen (DE)

( * ) Notice: Subject to any disclaimer, the term of this patent is extended or adjusted under 35 U.S.C. 154(b) by 0 days.

(21) Appl. No.: 09/068,929

(22) PCT Filed: Sep. 27, 1997

(86) PCT No.: PCT/EP97/05306
§ 371 (c)(1),
(2), (4) Date: Jun. 12, 1998

(87) PCT Pub. No.: WO98/14002
PCT Pub. Date: Apr. 2, 1998

(30) Foreign Application Priority Data

Sep. 27, 1996 (DE) .......................... 196 39 863

(51) Int. Cl.[7] .............................. H04N 3/14
(52) U.S. Cl. ...................... 348/297; 348/294
(58) Field of Search ................ 348/294, 296, 348/297

(56) References Cited

U.S. PATENT DOCUMENTS

| 5,565,915 A | * | 10/1996 | Kindo et al. | 348/308 |
| 5,619,262 A | * | 4/1997 | Uno | 348/297 |
| 5,872,596 A | * | 2/1999 | Yanai et al. | 348/297 |
| 5,982,318 A | * | 11/1999 | Yiannoulos | 348/294 |
| 6,075,564 A | * | 6/2000 | Mizuno | 348/294 |
| 6,130,713 A | * | 10/2000 | Merrill | 348/297 |
| 6,271,880 B1 | * | 8/2001 | Kameshima et al. | 348/297 |
| 6,330,030 B1 | * | 12/2001 | O'Connor | 348/297 |

FOREIGN PATENT DOCUMENTS

| EP | 0 749 234 A1 | 6/1996 |
| GB | 2 197 718 A | 5/1988 |
| JP | 07067042 | 3/1995 |

* cited by examiner

Primary Examiner—Wendy R. Garber
Assistant Examiner—Jacqueline Wilson
(74) Attorney, Agent, or Firm—Klaus J. Bach

(57) ABSTRACT

To avoid the overexposure and underexposure of pixels which occurs with high image contrasts, each pixel contains a local autoadaptive control. With the help of this control, each pixel automatically ends its integration period as soon as it has integrated enough photoelectric current. An analog signal represents the length of the integration period selected by the pixel. Together with the integrated pixel signal, it represents brightness information with high dynamics and with low requirements regarding the dynamics of the individual signals. Because of their local adaptivity, the image sensors are suitable for all applications where high brightness contrasts must be processed, such as guiding a motor vehicle in highway traffic, nature films and astronomy.

13 Claims, 4 Drawing Sheets

LOCAL AUTO-ADAPTIVE OPTIC SENSOR

BACKGROUND OF INVENTION

The present invention relates to a method of operating image sensors according to the "local autoadaptive method" of recording highly dynamic image scenes.

Electronic image sensors are known and are manufactured in a wide variety of technologies. Such sensors are designed so that a number of picture elements (pixels) are arranged in a suitable manner, usually as a single line or as a matrix in columns and lines. An image projected onto the image sensor is converted by the pixels into an electric signal proportional to the amount of incident light at the pixel locus. The respective proportionality constant is known as the conversion sensitivity (sensitivity) of the sensor. In a very widespread type of image sensor, the "integrating image sensor," the pixels generate the output signal by integrating photoelectric current'-generated charge carriers over a certain interval of time (integration time) to a capacitor. The electric signal is read out by means of suitable control signals (clock signal or read signal) applied to the pixel and readout paths leading away from the pixel and is sent with suitable means to image analyzing units or image utilizing units, such as a recording device.

An important feature of an image sensor is its dynamics, defined by the minimum and maximum image brightness at the pixel locus leading to a signal that can be utilized appropriately at the output of the image sensor. The dynamics are limited at the lower end by the electric noise of the output signal: a pixel signal smaller than the electric noise cannot be utilized. The dynamics are limited at the upper end by the saturation of the components used for signal conversion and signal transmission.

Another known problem with image sensors is that their dynamics are not sufficient to completely image the brightness contrasts occurring in many applications to the output signal. Therefore, either dark image parts are swallowed by the noise and/or lighter image parts are in saturation, which can also lead to additional interference such as smear or blooming. Several methods are known for eliminating the problem of limited dynamics.

U.S. Pat. No. 5,168,532 is cited as representative of a large number of patents and publications wherein the effective dynamics of an image sensor system are increased by the "dual readout" principle. For this purpose, the image sensor system is provided with an option of varying the known sensitivity-for example, by selecting the integration time of an integrating image sensor or, even more simply, with the help of an iris diaphragm. Then two images are output by the image sensor, one at a low sensitivity and one at a high sensitivity. These two images are then combined by a suitable method to form a complete image. The method "multiple readout" which has also been patented and published in a wide variety of variants (e.g., U.S. Pat. No. 5,638,118), supplemented by the "dual readout" method only inasmuch as instead of only two images, a larger number of images with different sensitivities are recorded, stored and combined. Both methods have the serious disadvantage of a complicated sensor system, which, in addition to the image sensor, also contains means for storing and processing the image data, such as a frame grabber.

A second group of methods of increasing sensor dynamics is compression of the image signal in signal generation in the pixel. With the conventional compression method of logarithmic compression, the light-dependent photoelectric current' is converted to a logarithmically dependent signal voltage by utilizing the logarithmic voltage-current characteristic of diodes or MOS transistors in operation below the threshold voltage, as published by N. Ricquier and B. Dierickx, for example, in "Active Pixel CMOS Image Sensor with On-Chip Non-Uniformity Correction," IEEE Workshop on CCDs and Advanced Image Sensors, California, Apr. 20–22, 1995. These and all other compression sensors lose image details due to dynamic compression. In addition, fixed interference (so-called fixed pattern noise or FPN) which occurs in the pixels and the signal paths due to local fluctuations in component parameters such as transistor threshold voltages or capacitances is amplified exponentially, which must in turn be corrected by expensive measures. Other methods (for example, U.S. Pat. No. 5,572,074 or "Analog VLSI Phototransduction by Continuous-Time, Adaptive, Logarithmic Photoreceptor Circuits" by T. Delbruck and C. A. Mead in *computation and Neural Systems Program, Technical Report, CNS Memorandum No. 30*, 1994, pages 1–23, California Institute of Technology, Pasadena, Calif. 91125) control the pixel sensitivity locally through the output signal produced by the pixel itself with the help of a complicated pixel circuit; however, this method again effectively corresponds to the compression method with the same disadvantages resulting from it.

Locally adaptive methods are better methods of operating image sensors with high dynamics. A locally adaptive method is characterized in that the sensitivity of the image sensor is not adjusted for all pixels at the same time (globally) but instead is adjusted for smaller subgroups, preferably individually for each pixel (locally). According to the nature of the image sensors, it is possible to connect at different points in the signal path.

Methods that reduce, pixel by pixel, the light striking the pixel are described in U.S. Pat. No. 5,410,705 (attenuation by polarizers) and U.S. Pat. No. 5,218,485, for example. All these methods presuppose a more complex optical structure and an expensive external system for controlling the attenuation elements.

Simpler systems with higher dynamics are achieved with such locally adaptive methods which control the integration time on a pixel by pixel basis. A conventional method with locally adaptive integration time uses individual pixel reset, IPR, for example, as reported by O. Yadid-Pecht, B. Pain, C. Staller, C. Clark and E. Fossum in "CMOS Active Pixel Sensor Star Tracker with Regional Electronic Shutter," in *IEEE Journal of Solid-State Circuits*, vol. 32, no. 2, Feb. 1997 and in "Wide Dynamic Range APS Star Tracker," in *Solid State Sensor Arrays and CCD Cameras*, San Jose, Calif., *Proceedings of the SPIE*, vol. 2654 (1996) pp. 82–93, and by S. Chen, R. Ginosar in "Adaptive Sensitivity CCD Image Sensor," *Proceedings of the SPIE*, vol. 2415 (1995) pp. 303–309. With the sensors described here, the pixel circuits have been modified so that their integration capacitor can be reset individually in each pixel at any time. Due to this fact, an individual integration time can be achieved for each pixel in certain limits, and therefore the pixel sensitivity can be adapted to the light sensitivity striking the respective pixel locus. The methods described here are characterized by a low additional expense in the pixel circuit with high dynamics at the same time.

With the locally adaptive image sensor (LAS) developed at the Institute for Semiconductor Electronics at the University of Siegen, the integration time of each pixel can be programmed individually into the pixel in the form of an analog voltage before the actual integration phase (see T. Lulé, H. Fischer, S. Benthien, H. Keller, M. Sommer, J.

Schulte, P. Rieve, M. Böohm, "Image Sensor with Per-Pixel Programmable Sensitivity in TFA Technology"; H. Reichl, A. Heuberger, Micro System Technologies '96, VDE Verlag, Berlin, Offenbach, pages 675 ff., 1996).

A disadvantage of the IPR and LAS methods, however, is the considerable expense in terms of supplementary circuits which are needed to generate, pixel by pixel, the exposure times required for the next integration cycle and the resulting driving clock pulses from the image read out last. The additional disadvantage of the IPR methods is the problem that all pixels must be reset in the desired sequence during the integration phase, which leads to collisions and nondeterministic clock pulse overcoupling on the sensitive pixel electronics. In addition, all the adaptive methods described so far have the disadvantage of time delay; the sensitivity to be set for an integration phase is obtained from the pixel signals of the preceding integration phase, so that proper setting of pixel sensitivity according to the situation cannot be reliably guaranteed.

SUMMARY OF THE INVENTION

The invention is based on the problem of adapting the sensitivities of the pixels of an image sensor with minimal circuitry and without time delay to the brightness prevailing at the pixel locus, thereby increasing the effective dynamics of the image sensor.

This object is achieved by the adaptation to the brightness prevailing at the pixel locus by the pixel circuit itself, where the pixels are locally autoadaptive.

The principle of local autoadaptivity was made known by O. Yadid-Pecht in "The Automatic Wide-Dynamic-Range Sensor," *SID 93, Intl. Symp., Digest* (1993) pp. 495–498, where local autoadaptivity is achieved by the ability of the pixel to reset itself when the integrated signal exceeds a threshold. In principle, this prevents saturation of pixels, but integration time is nevertheless not adapted reliably to the light intensity striking the pixel, because it may occur, for example, that a weakly illuminated pixel is reset again just before the end of the integration phase and no mentionable signal voltage can be integrated in the very short integration time remaining.

Furthermore, the integration time selected by the pixel must be reported to subsequent image analyzing stages by a suitable method so that the brightness at the pixel locus can be reconstructed from the two parameters, the integration time and the integrated pixel signal. O. Yadid-Pecht; leaves this problem largely unanswered, and mentions only that the integration time should be stored locally in four flip-flops, which leads to a considerable expense in terms of pixel circuit and additional control lines ("Widening the Dynamic Range of Pictures," *High Resolution Sensors and Hybrid Systems*, San Jose, Calif., *Proceedings of the SPIE*, volume 1656 (1992) pp. 374–382). So as not to make the, effective size of the pixel area completely uneconomical, the author also proposes that the locally autoadaptive control be implemented only once per pixel block of 8×8 pixels, for example, which immediately destroys the advantage of local autoadaptivity, because a strong light-dark transition within this pixel block leads to the same restrictions on dynamics as those which occur with the globally adaptive sensors.

The solution to the problem according to this invention consists of an integrating, locally autoadaptive pixel which automatically terminates its integration time autarchically even before so many photo-generated charges have been integrated that the output signal is saturated. This method thus differs from that described above inasmuch as the pixel itself determines the end time of the integration period and not the starting time.

An advantageous method of ending the integration time is an electronic switch which is looped into the path of the photoelectric current' from the detector to the integration capacitor and which interrupts the current path from the detector to the capacitor to terminate the integration time. A method equivalent to that described above is an electronic switch which establishes a conducting connection between a first integration capacitor which the light-proportional photoelectric current' flows during the entire integration phase and a second holding capacitor at the time when the integration time of the respective pixel is to be ended so that the voltage on the holding capacitor after the end of the integration phase is proportional to the voltage on the integration capacitor at the above-mentioned time. Pixel circuits with such electric switches are adequately well known and are used in almost all integrating image sensors for global control of the integration time.

The special advantage of the solution to the problem described above is that a sensor operated in this way has much higher dynamics in comparison with a traditional sensor at a lower cost, so that this sensor supplies output signals that can be evaluated in all image segments at much higher contrasts. In addition, the output signal is always in the upper control range for a greatly expanded image brightness range, which automatically leads to an improved signal-to-noise ratio and thus an improved image quality.

An advantageous refinement of the method consists of storing information (hereinafter referred to as the integration signal) in the pixel which provides information about the length of the integration time of the pixel and is read out of the image sensor together with the integrated pixel signal so that the brightness prevailing at the respective pixel locus can be determined unambiguously from the integration signal and the pixel signal.

It is advantageous to store the integration signal in an analog form in the pixel, i.e., in the form of a voltage, a current or a charge, for example. Such analog information storage devices as a capacitor or a current level storage device are adequately well known and can be implemented in a smaller area in conventional image sensor technologies as CMOS, BiCMOS or TFT than a digital device with the same information content, as proposed by O. Yadid-Pecht, for example. However, storage of the integration signal as a digital signal can also be an advantageous option because it offers a much greater interference immunity.

In addition, there are the options of generating this integration signal autarchically within the pixel, inputting it into the pixel from the outside or generating it with the help of signals input into the pixel from the outside. The signal is preferably input into the pixel completely from the outside because in this way additional components for signal generation in the pixel are eliminated and the pixel need only store the externally applied signal. The signal to be input from the outside is suitably applied to all the pixels or at least to large groups of pixels such as entire columns or lines of pixels at the same time, so that the number of generators that must be supplied for this signal can be lower than the number of pixels which the sensor has. These generators then supply a signal such as a voltage or a current or a digital word which is preferably monotonic with the integration time already elapsed, such as a voltage ramp. As soon as a pixel has ended its integration time, it stores not only the pixel signal integrated by that time in the exposure capacitor but also the integration signal applied externally by its respective generator in its internal integration signal memory.

The special advantage of the solution to the problem described above is that the brightness information is divided into two signal parameters—first, the pixel signal, and second, the integration signal which provides information about the integration time. When divided into these two signals, much higher brightness dynamics can be reproduced than would be possible with a single signal, because the integration signal provides a coarse scaling, so to speak, while the pixel signal supplies detailed information. In the commercial field in particular, where numerous electric interference sources are limited to the transmission paths, this division of the dynamics represents the only possibility for processing images with very high signal dynamics (>100 dB).

An advantageous further improvement on the method consists of the fact that the integration can be ended only at a few times outside the times indicated by the pixels, which are defined by a clock signal applied to the pixel from the outside. The advantage of this discretization of time is more precise control of the integration periods that can be selected by the pixels. In particular the very short integration times established at high illuminance levels must be set and detected by the integration signal with such a high precision that the inaccuracies correspond to much shorter periods of time than the integration time per se, which is achieved in an especially advantageous manner by locked discretization of the integration times.

An advantageous further embodiment of the method, especially in conjunction with the time discretization of the integration periods and the use of an analog integration signal, is to use an amplitude-discretized analog integration signal such that the integration signal can assume only discrete amplitudes. Amplitude discretization of the integration signal has the advantage that the following image analyzing stages can reconstruct the selected integration period precisely by forming a threshold, and the interference such as noise and FPN which is unavoidable in analog circuits has no effect on the formation of a threshold if there is a sufficient distance between discretization stages and thus has no effect on the reconstructed integration time.

The case of digital storage of the integration signal naturally involves a discretization of values which corresponds to the aforementioned amplitude discretization of the analog signal. In addition, digital storage can be used most advantageously together with said time discretization, because a digital value can be assigned unambiguously to each integration time in this way. When considered from the standpoint of how it is justifiable in the most modern memory technologies for a grossly amplitude-discretized analog signal to be a multi-level digital signal, the transition from a pure binary digital signal to the amplitude-discretized analog signal is fluid and rich in variants.

An advantageous refinement of the method is the use of an exponential distribution of the discretized integration periods. An exponential distribution refers to a selection of predetermined integration periods that can be selected by the pixel such that an integration period is longer by a fixed factor than the next shorter period that can be selected. This is a distribution that is known from other applications, such as the shutter speed of a camera, for example, which ensures a uniform coverage of several powers of ten of possible light intensities.

An advantageous embodiment of the method is the technological implementation of the locally autoadaptive image sensor in the TFA technology developed by Professor Böhm and his colleagues at the Institute for Semiconductor Electronics of the University of Siegen, as described, for example, by Professor Böhm in "Intelligent Image Sensor Systems in TFA (Thin Film on ASIC) Technology," a lecture delivered at the Special Course on Intelligent Sensors, University of Roorkee, Roorkee U. P., India, 1995. The advantage of vertical integration of the electro-optical detector on the signal processing ASIC presented there is manifested especially with locally autoadaptive sensors, because pixel electronics and detector do not mutually take each other's places as is the case in pure CMOS technology, for example, but instead the chip area taken up by the somewhat more extensive pixel electronics is available at the same time to the detector above it, which is thus more sensitive.

Other advantageous embodiments of method may be derived from the following.

One embodiment of the invention, the preferred device for carrying out the methods described above, is shown in the following figures and described in detail below. This embodiment is an image sensor implemented in the TFA technology according to this invention with 90 dB dynamics.

DETAILED DESCRIPTION OF THE INVENTION

Figure 1:
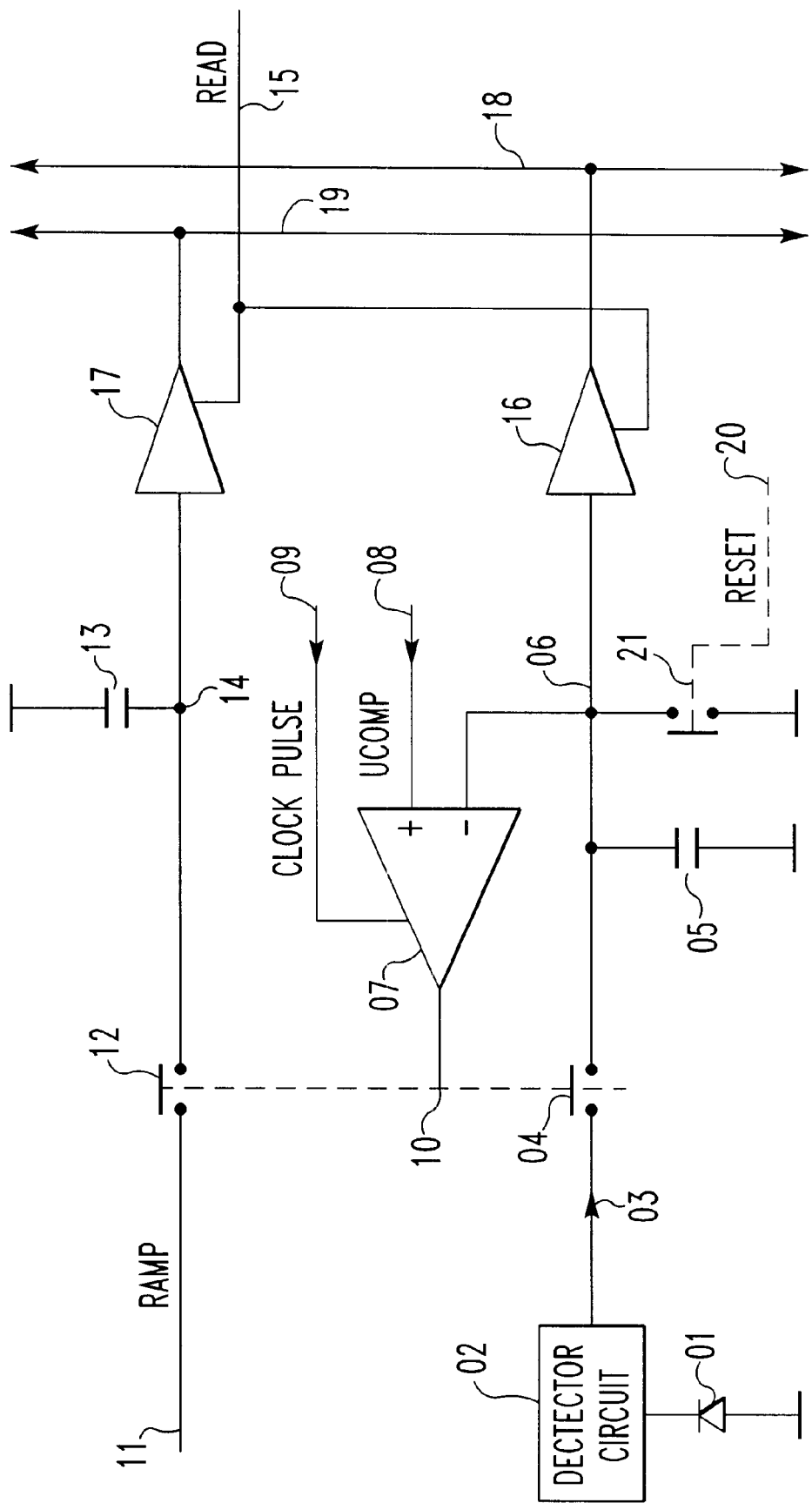
FIG. 1 shows the block diagram of the locally autoadaptive pixel electronics with automatic integration cutoff and integration signal storage.

FIG. 1 shows the block diagram of the locally autoadaptive pixel implemented in TFA technology. The pixel circuit has photo-sensitive detector 01 of amorphous silicon, whose cathode is connected to the detector circuit 02 which is implemented in the pixel circuit. The detector circuit is a specific of the TFA technology and is not important for the local autoadaptivity of the pixel. It keeps the voltage on the cathode of detector 01 at a constant level, which suppresses the TFA-specific couplings between neighboring detectors.

The photoelectric current' 03 originating from the detector 01 and relayed by the detector circuit 02 is integrated to the integration capacitor 05 over the closed photoelectric current' switch 04 during the integration phase. The resulting pixel voltage 06 on the integration capacitor 05 is compared with a comparative voltage 08 supplied to the pixel from the outside. The result of the comparison appears at the control output 10 of pixel comparator 07 only after a clock signal of the clock pulse 09. If the pixel voltage 06 has exceeded the comparative voltage 08 at the time of the clock signal, the control output 10 switches the photoelectric current' switch 04 off and thus ends the integration period for the current integration phase. Simultaneously with each clock signal at clock pulse 09, a rising, stepped voltage ramp is applied at integration signal input ramp 11 and is sent over the closed integration signal switch 12 to integration signal capacitor 13. At the moment when control output 10 ends the photoelectric current' integration over switch 04, said control output 10 also opens the integration signal switch 12, so that integration signal voltage 14 on the integration signal capacitor 13 remains at the voltage level which was applied to the integration signal input ramp 11 at the time of cutoff.

In the following readout phase, a read signal at read input 15 causes the pixel signal buffer 16 and the integration signal buffer 17 to output the integrated pixel signal 06 and the fixed integration signal 14 on the pixel signal column line 18 or the integration signal column line 19.

Before the next integration phase, a reset signal at reset input 20 closes reset switch 21 and thus erases the integrated pixel signal 06. With the next clock signal at clock input 09, the photoelectric current' switch 04 and the integration signal switch 12 close again, and the next integration phase begins.

Figure 2:
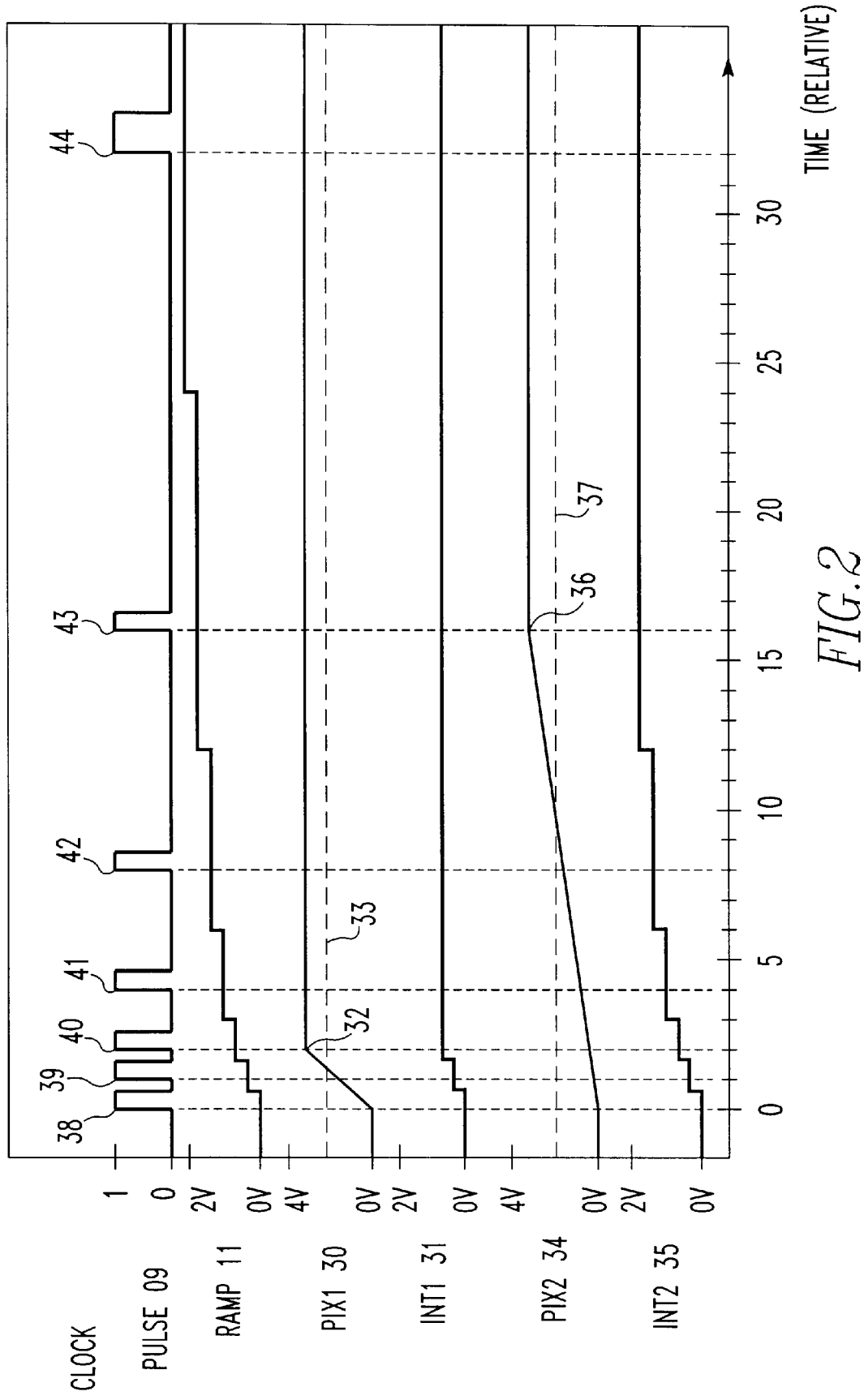
FIG. 2 shows the control signals for operation of the pixel according to FIG. 1 during the integration phase.

FIG. 2 shows the clock 09 and ramp 11 control pulses plus the integration signal 14 and pixel signal 06 each for two pixels—one pixel with high lighting (Pixl 30 and Intl 31) and a pixel at lower lighting (Pix2 34 and Int2 35). The signal diagram shows an embodiment with six selectable exponentially distributed integration times 39 through 44, where the time axis is given in relative units.

The integration phase begins with the first rising edge 38 of clock pulse 09, after which the integrated pixel voltages Pixl 30 and Pix2 34 increase. With each additional rising edge of clock pulse 09, a pixel at a high enough pixel voltage can end its integration period. For example, if a pixel at clock pulse edge 39 were to end its integration, then its integration period would last one unit of time, at clock pulse edge 40 it would last for two units of time, at clock pulse edge 41 it would last for four units of time, at clock pulse edge 42 it would last eight units of time, and at clock pulse edge 43 it would amount to sixteen units of time; if a pixel were to end its integration period at clock pulse edge 44, its integration period would last 32 units of time. The selectable units of time in this embodiment have thus been selected exponentially to the base 2.

The comparative voltages Ucomp 08 would be set at a half signal amplitude 33 or 37 for this distribution of units of time. If a pixel signal 05 has not exceeded half the signal amplitude within one integration period, it will not exceed the full signal amplitude in the next longer integration period which is twice as long, so that it can be integrated further, assuming that the brightness at the pixel locus does not change significantly during the following additional integration time. If, however, a pixel signal 06 has already exceeded half the signal amplitude within an integration period, it would exceed the full signal amplitude in the next longer integration period which is twice as long, so that the integration must be ended. Due to this combination of selectable integration times and comparative voltage, it is thus ensured that the integrated pixel voltage is always in the upper half of the full signal amplitude. The choice of a lower comparative voltage represents an improvement in robustness with regard to fluctuations in brightness in the course of an integration phase. This makes it possible for the pixel brightness to increase to a limited extent during the integration phase without the pixel thereby becoming saturated.

Figure 3:
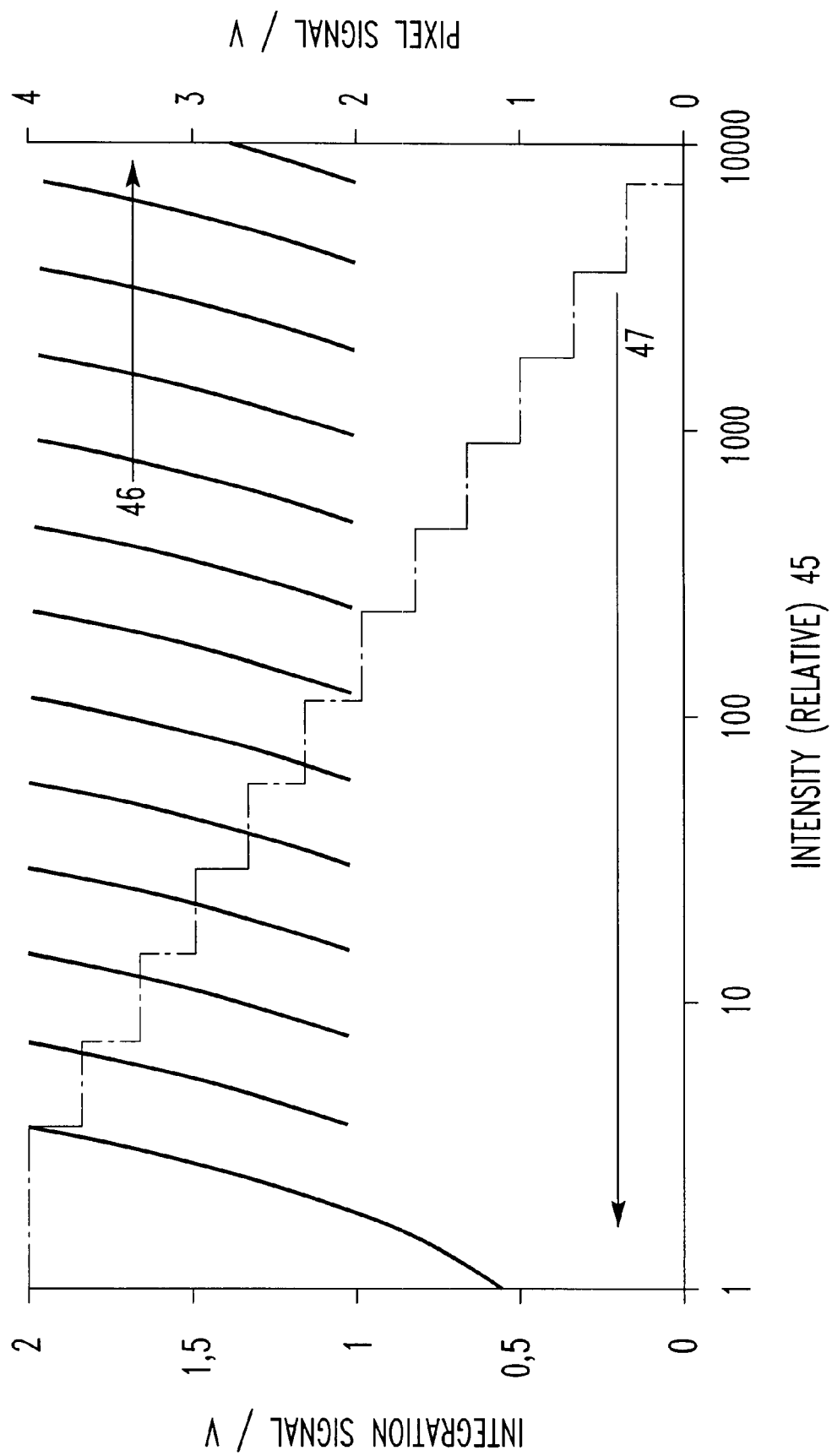
FIG. 3 shows the integration signals and pixel signals output in the readout phase following the integration phase, plotted a, a function of the light intensity occurring on this pixel.

Pixel signal 46 and integration signal 47 which are integrated over the relative lighting intensity in FIG. 3 illustrate this very advantageous property of the locally autoadaptive pixel. Owing to the logarithmic plotting of the intensity on the horizontal axis, the pixel signal curve appears curved, while the ramp stages 11 which are distributed at exponential intervals have equal widths.

Figure 4:
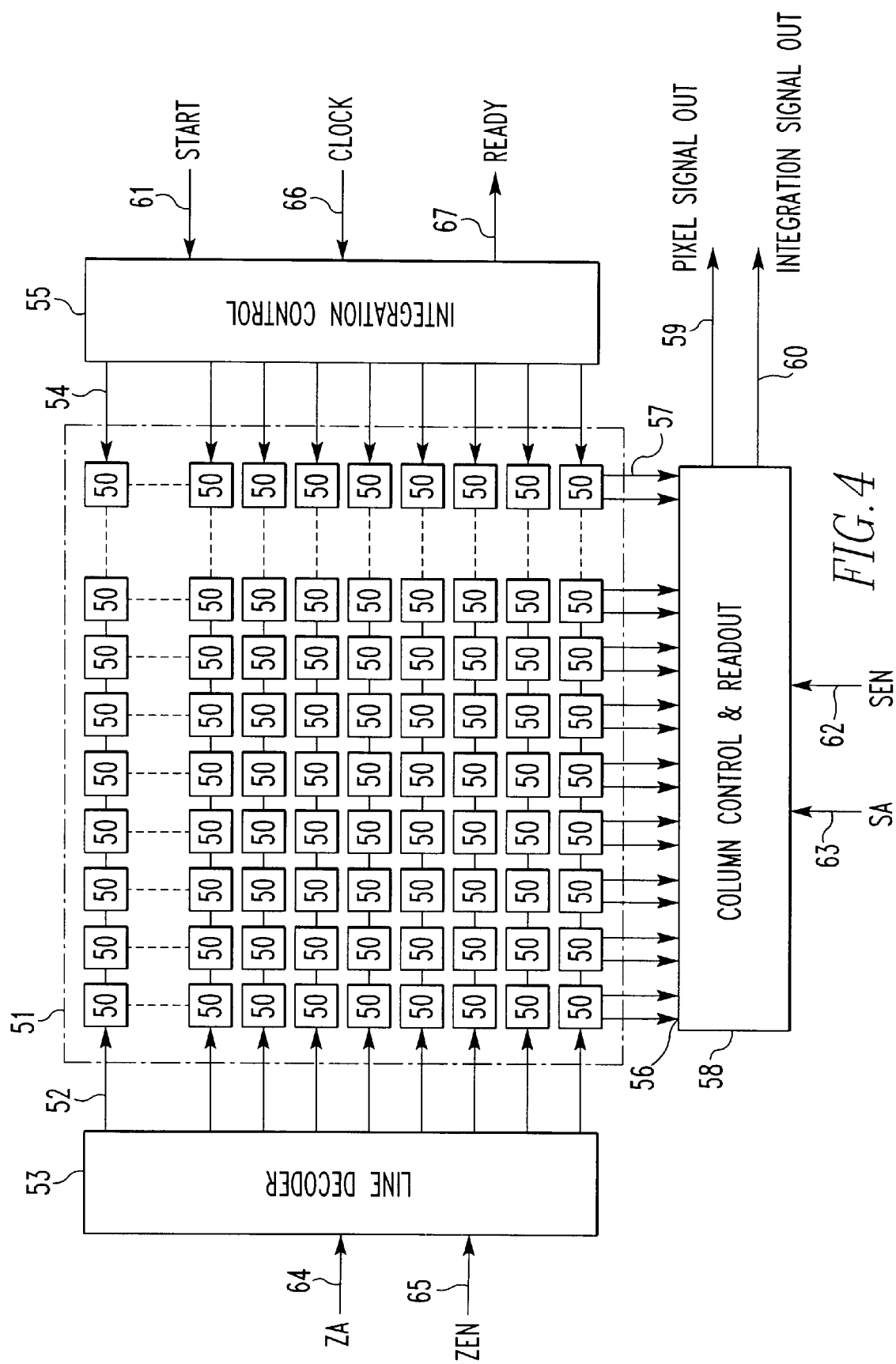
FIG. 4 shows schematically the interaction of the pixels of an area sensor with the peripheral circuits on the image sensor chip.

The block diagram shown in FIG. 4 shows schematically the interaction of pixel circuits 50 with the peripheral components 53, 55 and 58 in an area sensor. During the integration phase, the integration control 55 supplies pixels 50 of the pixel matrix 51 arranged in columns and rows with the required control signals such as reset 20, clock pulse 09, ramp 11 and Ucomp 08 which are generated by integration control 55 from an input clock pulse Clk 66. The signals are generated together for all pixels 50, so that all pixels 50 of pixel matrix 51 begin their integration periods in synchronization, while they select the end time themselves as described above.

A signal at ready output 67 indicates the end of the integration phase by a signal to the parts of the circuit outside the chip. Now they can apply a line address ZA 64 and line release signal ZEN 65 to line decoder 53, which then controls the desired line reading line 52. Line reading line 52 is connected to the pixel reading lines read 20 of all pixels 50 in the line and ensures that all pixels 50 of the selected line output their integrated pixel signals 06 and fixed integration signals 14 on pixel signal column lines 18 and integration signal column lines 19.

Of all pixel signal and integration signal column lines 56, 57 applied in parallel to the column control and readout 58, the column control and readout 58 selects the column selected by column address SA 63 which is supplied externally. With the applied column release signal SEN 62, the selected pixel signal 06 and the selected integration signal 14 are output to pixel output Pixaus 59 and integration signal output Intaus 60. After successful readout of all pixels 50, the next integration phase is then started in integration control 55 by a signal at start 61.

What is claimed is:

1. A method of operating integrating image sensors, comprising the steps of:
   a) arranging a plurality of light converting pixels, each of the pixels comprising:
      i) a light-sensitive element (01) for photoelectric conversion of a light intensity falling thereupon in a photoelectric current which depends on the light intensity;
      ii) an integrating device (04, 05) for integrating the photoelectric current to a pixel signal (06) over a certain integration period within an integration phase;
      iii) a duration controlling device (07–10) for determining a starting and an ending time of the integration period;
      iv) a readout device (15) for relaying the pixel signal (06) during a readout phase which corresponds to an amount of the integrated photoelectric current;
   b) processing previously known signals relayed by the pixels and supplying output signals;
   c) supplying a control signal to the integrating device, duration controlling device and readout device, whereby the output signal is a signal reflecting a light image picked up by the image sensor,
   wherein, the duration controlling device of the pixel is influenced by the integrating device of the pixel in such a way that the duration controlling device selects the ending time of the integration period as a function of the light intensity striking the pixel, wherein, higher light intensity leads to a shorter integration period and lower light intensity leads to a longer integration period and,
   wherein, each of the plurality of pixels has stored integration duration information (14) after the end of the integration phase which provides information on how long the integration period of the pixel was, the integration duration information (14) being read out with the pixel signal (06).

2. A method according to claim 1, wherein the duration controlling device influences the ending time of the integration period in conjunction with a first electronic switch, wherein the first electronic switch interrupts flow of photoelectric current into the integrating device to end the integration period.

3. A method according to claim 1, wherein the duration controlling device influences the ending time of the integration period in conjunction with a second electronic switch, wherein the second electronic switch is looped in between a previously known integrating device and a storage device, wherein the second electronic switch interrupts a signal path between the known integrating device and the storing device at the ending time, whereby, after the end of the integration phase, the storing device has stored an integration signal which relates to the ending time of the pixel signal delivered by the integrating device.

4. A method according to claim 3, wherein the integration duration information is a digital signal.

5. A method according to claim 3, wherein the integration duration information is an analog signal.

6. A method according to claim 5, wherein the integration duration information is an amplitude-discretized analog signal.

7. A method according to claim 3, wherein the integration signal is generated autarchically in the pixel.

8. A method according to claim 3, wherein the integration signal is generated in the pixel with the assistance of outside signals applied to the pixel.

9. A method according to claim 3, wherein the integration signal is preferably supplied to the pixel at the ending time from an outside signal which is retained by the pixel at a proper time.

10. A method according to claim 3, wherein the duration controlling device decides to terminate the integration of the pixel signal only at certain discrete times within an integration phase, wherein the discrete times are defined by outside signals applied to the pixel.

11. A method according to claim 10, wherein the discrete times have an exponential distribution whereby an integration period which can be selected by choosing an ending time is longer by a fixed factor than a next shorter selectable integration period.

12. A method according to claim 10, wherein the discrete times have a dual exponential distribution whereby an integration period which can be selected by choosing an ending time is twice as long as a next shorter selectable integration period.

13. A device for controlling image sensors, comprising:
   a) an arrangement of light converting pixels, each of the pixels comprising:
      i) a light-sensitive element (01) for photoelectric conversion of a light intensity falling thereupon in a photoelectric current which depends on the light intensity;
      ii) an integrating device (04, 05) for integrating the photoelectric current to a pixel signal (06) over a certain integration period within an integration phase;
      iii) a duration controlling device (07–10) for determining a starting and an ending time of the integration period;
      iv) a readout device (15) for relaying the pixel signal (06) during a readout phase which corresponds to an amount of the integrated photoelectric current;
   b) a device for processing previously known signals relayed by the pixels and supplying output signals;
   c) a pixel controlling device which supplies a control signal to the integrating device, duration controlling device and readout device, whereby the output signal is a signal reflecting a light image picked up by the image sensor, wherein, the duration controlling device of the pixel is influenced by the integrating device of the pixel in such a way that the duration controlling device selects the ending time of the integration period as a function of the light intensity striking the pixel, wherein, higher light intensity leads to a shorter integration period and lower light intensity leads to a longer integration period and, wherein, each of the plurality of pixels has stored integration duration information (14) after the end of the integration phase which provides information on how long the integration period of the pixel was, the integration duration information (14) being read out with the pixel signal (06).

* * * * *